US011734722B2

(12) United States Patent
Newman (10) Patent No.: US 11,734,722 B2
(45) Date of Patent: *Aug. 22, 2023

(54) VISUAL TRIGGER IN PACKAGING

(71) Applicant: MENICON SINGAPORE PTE LTD., Singapore (SG)

(72) Inventor: Stephen D. Newman, Singapore (SG)

(73) Assignee: Menicon Singapore PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,991

(22) Filed: Apr. 27, 2022

(65) Prior Publication Data

US 2022/0253903 A1 Aug. 11, 2022

Related U.S. Application Data

(63) Continuation of application No. 15/578,638, filed as application No. PCT/SG2016/050255 on May 30, 2016, now Pat. No. 11,354,705.

(30) Foreign Application Priority Data

May 30, 2015 (SG) .......................... 10201504283Q (51) Int. Cl.
*G06Q 30/00* (2023.01)
*G06Q 30/0251* (2023.01)
(Continued)

(52) U.S. Cl.
CPC ....... *G06Q 30/0261* (2013.01); *B65D 75/326* (2013.01); *B65D 85/54* (2013.01);
(Continued)

(58) Field of Classification Search
None
See application file for complete search history.

(56) References Cited

U.S. PATENT DOCUMENTS 7,281,794 B2 10/2007 Heacock
8,392,018 B2 * 3/2013 Wang ...................... G07F 11/68
700/231
(Continued)

FOREIGN PATENT DOCUMENTS

CN 101217031 A 7/2008
CN 101516739 A 8/2009
(Continued)

OTHER PUBLICATIONS

Laehdesmaeki; Possibilities_glucose_monitoring_by_a_contact_lens; IEEE 2010; 17 pages; 2010.*
(Continued)

*Primary Examiner* — Radu Andrei
(74) *Attorney, Agent, or Firm* — Dorsey & Whitney LLP (57) ABSTRACT

A contact lens package includes a first package layer and a second package layer joined to the first package layer at an edge of the first package layer. The first package layer and the second package layer collectively define, at least in part, a cavity and a contact lens is disposed within the cavity. A visual trigger is depicted on either the first package layer or the second package layer, and the visual trigger is identifiable by a mobile device to be associated with an executable file.

20 Claims, 8 Drawing Sheets

(51) Int. Cl.
  *G06F 9/451* (2018.01)
  *B65D 75/32* (2006.01)
  *B65D 85/00* (2006.01)
  *G06Q 30/0601* (2023.01)
  *G02C 7/04* (2006.01)
  *G06K 7/10* (2006.01)
  *G06K 7/14* (2006.01)

(52) U.S. Cl.
  CPC ......... *G06F 9/453* (2018.02); *G06Q 30/0267* (2013.01); *G06Q 30/0623* (2013.01); *B65D 2585/545* (2013.01); *G02C 7/04* (2013.01); *G06K 7/10861* (2013.01); *G06K 7/143* (2013.01)

(56) References Cited

U.S. PATENT DOCUMENTS

| | | | |
|---|---|---|---|
| 8,606,645 | B1 | 12/2013 | Applefeld |
| 2009/0102859 | A1 | 4/2009 | Athsani et al. |
| 2010/0106510 | A1* | 4/2010 | Topchy ............... H04H 60/58 704/E19.009 |
| 2010/0181322 | A1 | 7/2010 | Perillon et al. |
| 2010/0181332 | A1* | 7/2010 | Wang ............... G07F 17/0092 235/375 |
| 2011/0004624 | A1* | 1/2011 | Bansal ............... G10L 15/02 704/251 |
| 2011/0042243 | A1 | 2/2011 | Newman |
| 2011/0315893 | A1 | 12/2011 | Pugh et al. |
| 2012/0158502 | A1* | 6/2012 | Chung ............... G06Q 30/0255 705/14.66 |
| 2012/0229624 | A1 | 9/2012 | Calman et al. |
| 2012/0229657 | A1 | 9/2012 | Calman et al. |
| 2013/0193201 | A1* | 8/2013 | Bradley ............... G06F 16/9554 705/26.61 |
| 2014/0085083 | A1 | 3/2014 | Sabeta |
| 2014/0172570 | A1 | 6/2014 | Y Arcas et al. |
| 2014/0246337 | A1 | 9/2014 | Newman |
| 2015/0015843 | A1 | 1/2015 | Pugh et al. |
| 2015/0090779 | A1 | 4/2015 | Malone |

FOREIGN PATENT DOCUMENTS

| | | | |
|---|---|---|---|
| CN | 201967575 | U | 9/2011 |
| CN | 103049081 | A | 4/2013 |
| CN | 203520163 | U | 4/2014 |
| CN | 103987355 | A | 8/2014 |
| JP | 2006206252 | A | 8/2006 |
| JP | 2006295898 | A | 10/2006 |
| JP | 2014099176 | A | 5/2014 |
| JP | 2015502891 | A | 1/2015 |
| KR | 20140024684 | A | 3/2014 |
| KR | 1020140024684 | | 3/2014 |
| KR | 20140082825 | A | 7/2014 |
| KR | 20150041710 | A | 4/2015 |
| RU | 2543569 | C1 | 3/2015 |
| TW | 380211 | B | 1/2000 |
| TW | 200519450 | A | 6/2005 |
| TW | I341404 | B | 5/2011 |
| WO | WO-2010048459 | A1 * | 4/2010 ........... G06F 16/683 |
| WO | WO-2010077919 | A1 * | 7/2010 ............ B65D 83/00 |
| WO | 2014006580 | A1 | 1/2014 |

OTHER PUBLICATIONS

Mohammadi; Latanoprost Release from Commercial Contact Lenses' Plos One 2014, 10 pages; 2014.*
Examiner's Requisition dated Nov. 15, 2021 received in Canadian patent application No. 2,987,713.
Extended European Search Report for European Patent Application No. 16803865.1, dated Oct. 4, 2018 (8 pages).
Notification of Provisional Rejected dated Oct. 19, 2021 received in Korean Patent Application No. 10-2017-7035595.
Notification of Reason for Rejection dated Nov. 2, 2021 received in Japanese Patent Application No. 2017-562343.
TW Application No. 109137066; First Office Action and Search Report dated Mar. 1, 2022.
Written Opinion for Singapore Patent Application No. 10201504283Q, dated Jul. 23, 2018 (6 pages).

* cited by examiner

VISUAL TRIGGER IN PACKAGING

CROSS-REFERENCE TO RELATED APPLICATIONS

The present application is a continuation of U.S. application Ser. No. 15/578,638, filed 30 Nov. 2017, entitled "VISUAL TRIGGER IN PACKAGING," which is a national stage entry of International Application No. PCT/SG2016/050255, filed 30 May 2016, entitled "VISUAL TRIGGER IN PACKAGING," which claims priority to Singapore Application No. 10201504283Q, filed 30 May 2015, entitled "VISUAL TRIGGER IN PACKAGING," all of which are hereby incorporated by reference in their entireties.

BACKGROUND

Contact lenses are lenses that are placed directly on the surface of the eye. Contact lenses are typically worn to correct vision, but may be worn for cosmetic or therapeutic reasons. Often contact lenses are better suited for correcting a user's vision when certain types of medical conditions exist. For example, users with keratoconus and aniseikonia often have better results with contact lenses than with glasses.

A wearer of contact lens should properly handle and store the contact lens to avoid damaging the contact lens and/or contaminating the contact lens. Due attention to the contact lens' handling and storage instructions mitigate discomfort to the user as well as prevents damage to the contact lens that necessitates discharging the contact lenses before their expiration date.

One type of system for assisting the user in determining the condition of their contact lenses is disclosed in U.S. Patent Publication No. 2014/0085083 issued to Anton Sabeta. In this reference, a method for tracking ophthalmic lens care compliance comprises the steps of: including at least one sensor with the ophthalmic product for monitoring at least one ambient condition and for logging and recording at least one parameter associated with the ambient condition, following a predetermined event; comparing the parameter to a predetermined threshold and providing an outcome, the predetermined threshold corresponding to the ambient condition, and issuing an alert based on the outcome. U.S. Patent Publication No. 2014/0085083 is herein incorporated by reference for all that it contains.

SUMMARY

In one aspect of the invention, a contact lens package includes a first package layer and a second package layer joined to the first package layer at an edge of the first package layer. The first package layer and the second package layer collectively define, at least in part, a cavity and a contact lens is disposed within the cavity. A visual trigger is depicted on either the first package layer or the second package layer, and the visual trigger is identifiable by a mobile device to be associated with an executable file.

The executable file may include code that causes an image about the contact lens, a video unrelated to the contact lens, at least one still image, an entertainment video, a commercial, an instructional video to be depicted in a display of the mobile device, a presentation on retrieving the contact lens from the contact lens package, a presentation on keeping the contact lens clean, a presentation on inserting the contact lens into the user's eye, a presentation on contact lens maintenance when the contact lens is in the user's eye, and/or combinations thereof. Such a commercial may depict information about products related to the contact lens. Such instructional videos may contain information relating to the contact lens, storage information relating to the contact lens, other types of information about the contact lens, other types of information in general, or combinations thereof.

In some cases, the executable files are specific for features of the contact lens and/or contact lens package. Such features may be features for opening the package, features for storing the contact lens, features for proper use of the contact lens, colors of the contact lens, prescriptions of the contact lens, other types of features, or combinations thereof. Further, the visual trigger may be one of multiple visual triggers that are identifiable by a mobile device and associated with multiple executable files.

In another aspect of the invention, a contact lens package includes a first package layer and a second package layer joined to the first package layer at an edge of the first package layer. The first package layer and the second package layer collectively define a cavity and a contact lens is disposed within the cavity. A visual trigger is depicted on an outer surface of the contact lens package that causes an electronic device to retrieve an eye health presentation from a library and to present the presentation in a display of the electronic device when the visual trigger is within a field of view of a camera associated with the electronic device.

In yet another aspect of the invention, a contact lens package includes a first package layer and a second package layer joined to the first package layer at an edge of the first package layer. The first package layer and the second package layer collectively define a cavity and a contact lens is disposed within the cavity. A visual trigger is depicted on an outer surface of the contact lens package that causes an electronic device to retrieve an eye health presentation from a library and to cause the electronic device to present the eye health presentation when the visual trigger is identified within a field of view of a camera associated with the electronic device.

In some examples, the presentation includes an audio component. For example, the presentation may include music, spoken words, sounds, and other audio elements, or combinations thereof. Further, the presentation may include a visual component. For example, the presentation may include at least one still image, a video, an interactive display, an augmentation of what is depicted in the display with the visual trigger, another visual component, or combinations thereof.

Further, in an additional aspect of the invention, a mobile device includes a body, a display integrated into the body, a camera integrated into the body, a processor, and memory. The memory includes programmed instructions to cause the processor to display an image of a contact lens package in the display when the contact lens package is in a field of view of the camera, identify a visual trigger on the contact lens package, retrieve an executable file from a library associated with the visual trigger, and display at least one image in the display from the executable file.

In another aspect of the invention, a mobile device includes a body, a display integrated into the body, a camera integrated into the body, a processor, and memory. The memory has programmed instructions to cause the processor to recognize a visual trigger in the display when the visual trigger is in a field of view of the camera and to establish an electronic communication mode between the mobile device and a party associated with the visual trigger.

The electronic communication mode may be any appropriate type of mode. For example, the electronic communication mode may be established by sending a text message, accessing a communication portal containing multiple communication modes, retrieving contact information of the party, sending a message to the party, generating a user option to compose a message to the party, entering contact information of the party into an address book of the mobile device, receive a message from the party, or combinations thereof. In some examples, a message sent to the associated party may include information about the user receiving the package containing a product.

Further, the visual trigger may be incorporated in an image, on product packaging, on packaging of a contact lens, a face of an individual on product packaging, or combinations thereof. The visual trigger may be one of multiple visual triggers depicted on a single object.

The programmed instructions may cause the processor to display an option to establish the electronic communication mode, display an option to download data in response to recognizing a second visual trigger, display an option to stream data in response to recognizing a second trigger, display another type of option, display at least one icon in response to recognizing the visual trigger, or combinations thereof. The data may be downloaded to the mobile device and stored locally.

The data may be removed from the mobile device based on a condition. The condition may be that a predetermined time has lapsed since recognizing the visual trigger, that the downloaded data has been accessed through the mobile device a predetermined number of times, another condition, or combinations thereof.

In yet another aspect of the invention, a mobile device includes a body, a display integrated into the body, a camera integrated into the body, a processor, and memory. The memory has programmed instructions to cause the processor to recognize a visual trigger in the display when the visual trigger is in a field of view of the camera, establish an electronic communication mode between the mobile device and a party associated with the visual trigger, display an option to download data in response to recognizing a second trigger, download the data to the mobile device in response to user input, store the downloaded data locally, and remove the downloaded data based on a condition.

Any of the aspects of the principles detailed above may be combined with any of the other aspect detailed herein.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

Figure 1:
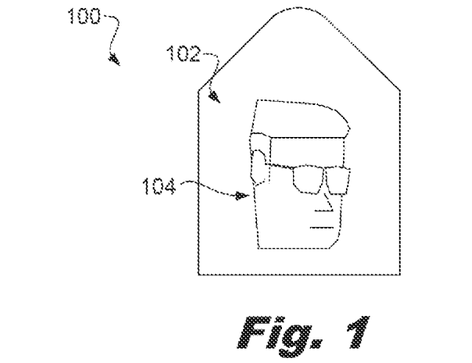
FIG. 1 illustrates a top view of an example of a contact lens package in accordance with the present disclosure.
Figure 2:
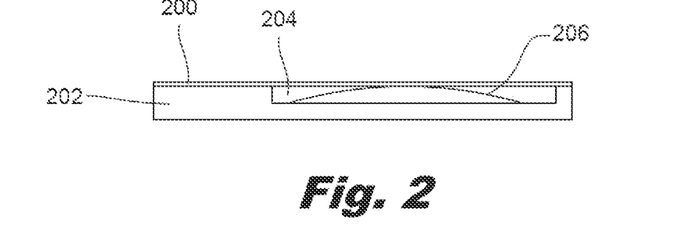
FIG. 2 illustrates a cross sectional side view of an example of a contact lens package in accordance with the present disclosure.

Particularly, with reference to the figures, FIGS. 1-2 depict packaging 100 for a contact lens in accordance with the present disclosure. In this example, the packaging 100 includes a first layer 200 and a second layer 202. The first layer 200 defines a bottom boundary of a cavity 204 within the packaging, and the second layer 202 defines a top boundary of the cavity 204. A contact lens 206 is disposed within the cavity 204.

In some examples, the first layer 200 is directly connected to the second layer 202. However, in other examples, one or more spacers may separate the first layer 200 from contacting the second layer 202. In such examples, the spacers may contribute to defining the cavity 204.

The contact lens described above may be any appropriate type of contact lens. For example, a non-exhaustive list of lens types may include soft lenses, rigid gas permeable lenses, hard lenses, ophthalmic lenses, bifocal lenses, multi-focal lenses, colored lenses, disposable lenses, extended wear lenses, monovision lenses, orthokeratology lenses, prosthetic lenses, silicone hydrogel lenses, special-effect lenses, specialty lenses, toric lenses, bi-toric lenses, cosmetic lenses, overlay lenses, onlay lenses, other types of lenses, or combinations thereof. The soft contact lenses may be made of any appropriate type of material. For example, the soft contact lenses may be made a plastic hydrogel polymer, hydroxyethyl methacrylate that contains water, silicone, or hydrophilic hydrogels. The rigid gas permeable contact lenses may be made of a firm plastic material that does not contain substantial amount of water. Rigid gas permeable contact lenses may permit oxygen to pass through its material to the eye. Further, hard contact lenses may be made of polymethyl methylacrylate or another hard material. Generally speaking, hard contact lenses prevent oxygen flow through the lens.

The packaging 100 may include any appropriate type of wording, images, graphics, and so forth that can convey information about the contact lens, its brand, its manufacturer, its distributer, or any other type of information. In some examples, information about the how to wear, store, or handle the contact lens may be included on the packaging 100. However, due to size limitations, not all of the information that is desirable to include on the packaging 100 can fit in the packaging's surface area.

In such circumstances, additional information may be conveyed by including a visual trigger 102 on the packaging 100 that can be used as part of a process for delivering the desired information to the user. Such a visual trigger may be identifiable through a camera, such as a camera that is built into a mobile device. In response to identifying the visual trigger, a processor may consult a library to determine which executable file to retrieve. In some examples, the processor is part of the mobile device, and the mobile device retrieves the appropriate executable file based on the visual trigger identified in the camera's field of view.

Any appropriate type of visual trigger may be used. In some examples, the visual trigger is an image depicted on the packaging. Such an image may be a face 104 of a specific person, an image of a specific object, another type of image, a symbol, an arrangement of symbols, another type of visual trigger, or combinations thereof. In some examples, the visual trigger is part of a promotion, such as an advertising promotion. In such an example, a celebrity, an actor, a supermodel, another type of person suitable for use in promotions, or combinations thereof may be depicted on the packaging. The face 104 of such a person, an article of clothing worn by such a person, another type of feature associated with such a person, or combinations thereof may be used as visual triggers.

The executable file may be downloaded to the mobile device, or in other examples, information from the executable file may be streamed to the mobile device. The executable file may cause the processor to display a still image, play a video, augment the display so that the packaging 100 has a different appearance through a display of the mobile device or is depicted in the screen with another object or image. Such images, videos, and/or augmentations may present through the mobile device's display instructions on how to handle and/or store the contact lenses. In other examples, the images, videos, and/or augmentations may present other types of information relating to the contact lens or that are unrelated to the contact lens.

Often, a lot of information is associated with contact lens' prescription. However, such information may be difficult to depict on the contact lens packaging. For example, information generally associated with a contact lens includes the user's name, eye practitioner's name, brand information, optical power measurements, diameter information, base curve information, safe use information, a wearing schedule, information about whether lenses are for daily or extended wear, a refill number, an expiration date, other types of information, or combinations thereof. By using the principles described above, the packaging may include some of the information associated with the contact lens, while using the visual trigger to cause other portions of the above information or other types of information to be sent to the user's mobile device. The information sent to the mobile device may include the type of contact lens within the packaging, health and safety concerns of the contact lens, general eye information, eye health information, warning signs relating to eye health, frequently asked questions, the prescription of the contact lenses, the contact lens' expiration date, information about when to replace the contact lens, other types of information associated with the contact lens, or combinations thereof. Further, the information may include commercials for products or services that may or may not be related to the contact lens. Additionally, the information may include entertainment or other types of data that are unrelated to contact lenses.

Figure 3:
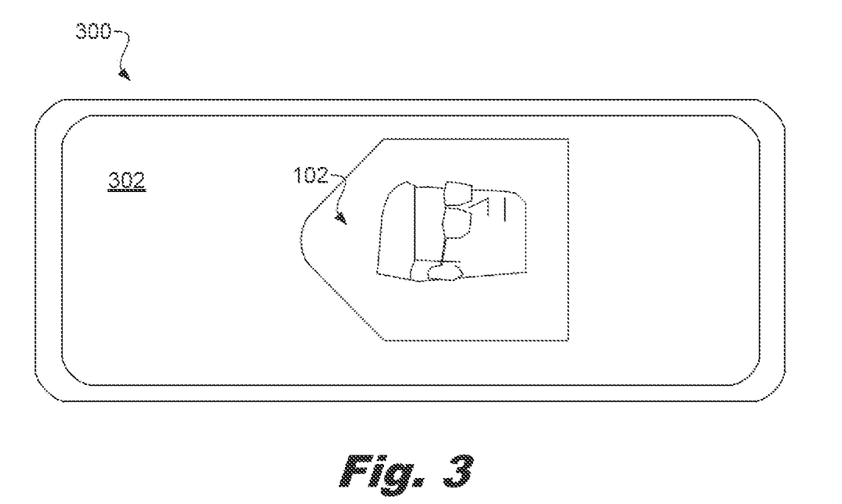
FIG. 3 illustrates a view of an example of a mobile device with a contact lens package within a field of view of a camera incorporated into the mobile device in accordance with the present disclosure.

FIG. 3 depicts a mobile device 300 with a display 302. In this example, the display 302 depicts what is in the field of view of a camera incorporated into the mobile device 300. Thus, in this example, the packaging 100 is in the camera's field of view and is depicted in the display 302.

The mobile device 300 may recognize the visual trigger 102 included in the packaging 100. In response to recognizing the visual trigger 102, the mobile device 300 may initiate a process of retrieving the executable file associated with the visual trigger 102. In one example, the mobile device 300 consults with a library that associates the visual trigger 102 with the executable file. The executable files may be located in the library and be downloadable from the library. In other examples, the executable files are stored in a different location, and the library is look-up table that indicates the appropriate executable file. In some cases, such a library may also include the location of the executable file for the mobile device 300 to retrieve.

In examples where the executable file is downloaded to the mobile device 300, the mobile device may execute the file. In response to executing the file, the executable file may cause the processor of the mobile device 300 to display images, videos, augmentations, documents, or other information according to the code of the executable file. In examples where the information from the executable file is streamed to the mobile device, the streamed information may be depicted in the display 302 as images, videos, augmentations, documents, or other information according to the code of the executable file.

For the purposes of this disclosure, an "augmentation" refers to depicting a real-world environment where elements of that real world environment are modified, added, replaced, and/or removed by a computer implemented process. In some cases, an augmented display may depict the contact lens packaging 100 as the contact lens packaging 100 is viewed in its real environment and additionally display wording adjacent to the contact lens packaging 100 explaining some aspect about the contact lens. In some examples, an augmentation, a still image, a video, an animated character, an interactive feature, an icon, or the like, may be presented in the display 302 along with the contact lens packaging 100.

In some examples, still images, documents, videos, and so forth may take up just a portion of the display 302 or they may fill the entire display 302. The executable file may contain just a visual component, such as documents, still images, videos, animations, or combinations thereof. However, in some examples, the executable file may also include an audio component where audio recordings or sounds are caused to be produced by speakers of the mobile device 300. In some cases, the executable file contains just an audio component.

Figure 4:
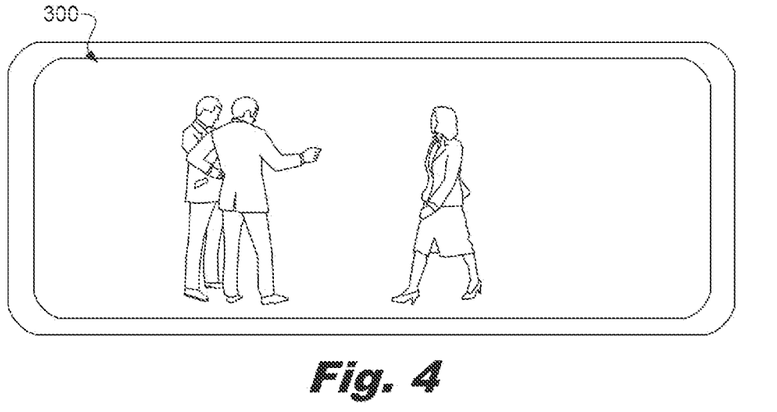
FIG. 4 illustrates a view of an example of presenting a video on the mobile device in accordance with the present disclosure.

In the example of FIG. 4, the mobile device 300 depicts a video from the executable file. Such a video may or may not be related to the contact lens, such as videos that are part of a promotion. Such a video may contain instructions for how to handle the contact lenses, how to wear the contact lenses, how to clean the contact lens, how to store the contact lenses, how to remove the contact lenses, how to avoid contaminating the contact lenses, how to insert the contact lenses into the user's eyes, other information about the contact lens, or combinations thereof.

In some examples, the video contains information that is unrelated to the contact lenses. Such a video may contain entertainment based on one of many user interests such as music, sports, drama, fiction, non-fiction, other genres, or combinations thereof. Such videos may be an enticement for the user to buy the contact lenses over contact lenses of another brand. The videos may include other topics that are not directly related to the contact lens, but are often of interest to demographics of people who wear contact lenses. For example, the video may include information about general eye health, conditions of the eye such as astigmatisms, myopia, cataracts, dry eyes, red eyes, glaucoma, keratoconus, double vision, hyperopia, presbyopia, cataracts, other conditions, or combinations thereof.

In the example of FIG. 4, the video fills the entire area of the display 302. However, in other examples, the video may include just a subset of the display's area. For example, a window may appear in the mobile device's window next to the contact lens packaging 100.

Figure 5:
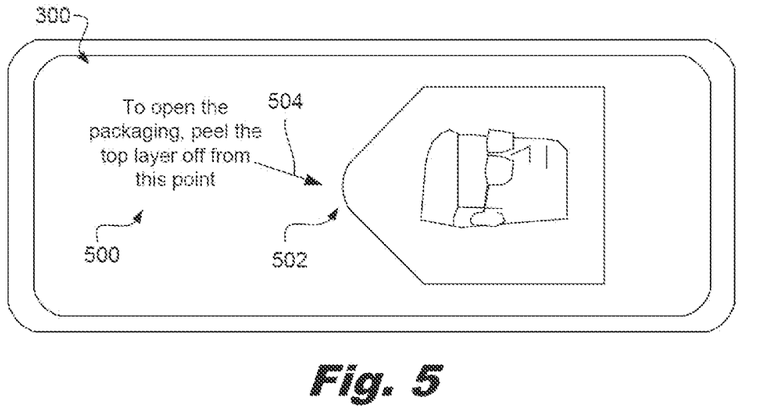
FIG. 5 illustrates a view of an example of presenting an augmentation on the mobile device in accordance with the present disclosure.

FIG. 5 depicts an example of an augmentation where words 500 appear in the display 302. These words 500 are positioned in the display 302 so that the words 500 are adjacent to a specific portion 502 of the packaging 100, and an arrow 504 points to the specific portion 502. The mobile device 300 may position the words or other types of augmented images so that they are placed appropriately in relation to the position of the packaging 100. In some cases, the wording 500, the arrow 504, or other types of augmentations may move in the display 302 as the packaging 100 moves in the display 302. In some of such cases, the mobile device 300 recognizes not just the visual trigger on the packaging 100, but also recognizes other features of the packaging 100. For example, the other features may include the perimeter 506 of the packaging 100, a designated location constructed to open the packaging 100, other features, or combinations thereof. In the example of FIG. 5, the positions of the arrow 504 and the words 500 are determined, at least in part, on the location of the specific portion 502 of the packaging 100. Thus, if the orientation of the packaging 100 changes, the positions of the words 500 and arrow 504 change as well.

Figure 6:
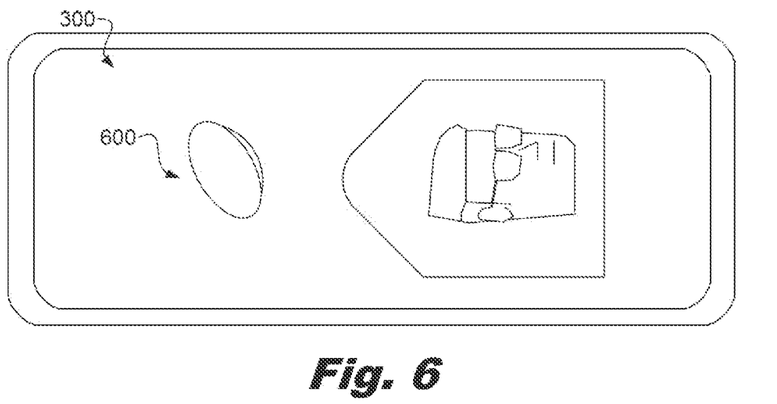
FIG. 6 illustrates a view of an example of presenting a still image on the mobile device in accordance with the present disclosure.

In the example of FIG. 6, a still image 600 is depicted in the display 302. In this example, the still image 600 represents a contact lens that is disposed within the package. Thus, the user can determine various features about the contact lenses by viewing the still image 600 in the mobile device's display 302. For example, the user can determine the size and shape of the contact lenses by looking at the still image 600. In situations where the contact lens is colored for making the user appear to have a different eye color, the user can determine the color of the contact lens through the mobile device's still image 600.

Such still images and/or augmentations of the contact lens may be useful when presented in a language spoken by the user when the user does not speak the same language as printed on the contact lens packaging 100. Additionally, such a still image 600 may be useful for situations where the packaging 100 does not depict an image of the contact lens.

While the example of FIG. 6 depicts a still image 600 of the contact lens, in other examples, a still image 600 may depict other products, scenes, information, or other images. In some examples, the still image's position is not oriented with respect to the position or orientation of the packaging's features. In such examples, the still image may appear in a particular location of the display 302 regardless of whether the still image obscures the digital representation of the packaging or not.

In yet other examples, an interactive image may be presented in the display 302. Such an interactive display may be manipulated with user interaction. For examples where the display is a touch screen, the user may move the interactive image by dragging the interactive image to the desired location. In other examples, the orientation of the interactive image may be changed so that the user can view the product featured in the interactive image from a different angle. Further, the user may be able to change the size of the interactive image. In other examples, the user may be able to dissemble the product in the interactive image or have the interactive image otherwise respond to commands from the user. While these examples have been described with reference to using a touch screen to interpret user commands, any appropriate type of user input may be used. For example, the user input may include touch pads, buttons, levers, dials, scrolls, microphones, cameras, other types of user inputs, or combinations thereof.

Figure 7:
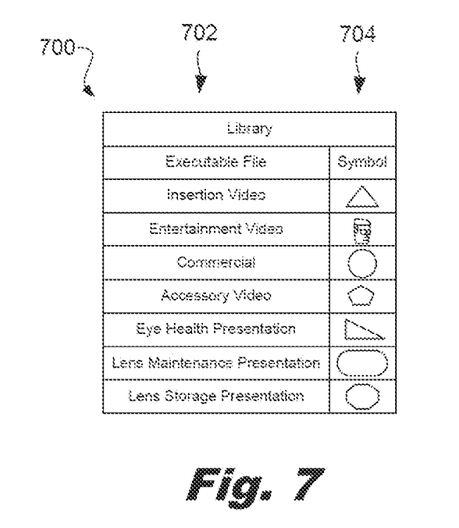
FIG. 7 illustrates an block diagram of an example of a library in accordance with the present disclosure.

FIG. 7 depicts an example of a library 700 in accordance with the principles described herein. In such an example, the library includes a first column 702 and a second column 704. The first column 702 includes an executable file, and the second column 704 includes a visual trigger associated with the executable files of the first column 702. In response to detecting a visual trigger of the second column 704, the mobile device may look up the visual trigger in the library 700 to determine the associated executable file. In some examples, a the library includes a link to the location of the file, an address of a location of the file, another type of location identifier, another mechanism for identifying the location of the executable file, or combinations thereof. In some examples, the code of the executable file is contained in with the library 700.

The mobile device may determine the associated executable file by consulting the library 700. In response to determining the associated executable file, the mobile device may locate the executable file. In some examples, the mobile device downloads the executable file. In other examples, the mobile device may receive a stream of data from the executable file. In some situations, the mobile device may determine the associated executable file by consulting the library 700, and then make a request to download at least a portion of the executable file, to receive a stream of content from the executable file, or otherwise gain access to a portion of the executable file.

Any appropriate type of visual trigger may be included in the executable file. In some examples, an application is downloaded to the mobile device. Such an application may include a program that recognizes the visual triggers, and causes the mobile device to consult the library 700. The library 700 may be stored locally on the mobile device. In other cases, the library 700 is stored at a remote location.

The visual trigger may be depicted on any appropriate object. The examples above depict the visual trigger associated on the packaging of a contact lens. But, in other examples, the visual trigger can be associated on the packaging of other products, letter heading, computer screens, billboards, books, printed material, other types of material, or combinations thereof. In some scenarios, a user may view the packaging at a retail location and view the visual trigger in the mobile device. In such examples, the mobile device may be caused to display information that may assist the user in deciding whether to purchase the product in the packaging. For example, such information may include a description of the product, instructions for maintaining the product, expiration date of the product, storage information of the product, related products associated with the product in the packaging, information about the manufacturer, materials of the product, health risks associated with the product, other types of information, or combinations thereof. In other scenarios, the visual trigger may be at least partially obscured by a portion of the packaging, so that the user has to open the packaging before having access to the view the visual trigger. Such a system may be in place so that the user has to purchase the product before gaining access to the visual trigger and its related content. If the executable file associated with the visual trigger includes a full feature video, the distributor of the product may desire that the user purchase the video before gaining access to the full feature video.

In some examples, the executable file may include an ability to establish a communication mode with a party associated with the product. For example, if the user purchases contact lenses online and receives the contact lenses in the mail, the user may view the visual trigger on the packaging with his or her mobile device when the user opens the mail. In response to reviewing the visual trigger with the mobile device, a message may be sent to the distributor, the manufacturer, a doctor, a salesman, a representative, or another party associated with the contact lenses informing such a party that the contact lens has been received by the user. In other examples, the user may purchase the contact lens from a brick and mortar retail store, and in response to viewing the visual trigger with the mobile device, the mobile device may present an option to the user to communicate with the manufacturer, distributor, salesman, other type of party, or combinations thereof. In some cases, a text message box may open automatically addressed to the party. In yet other examples, an email may be sent to the party. In additional examples, other types of communication modes may be established in response to viewing the visual trigger with the mobile device. In some examples, the mobile device opens a portable that contains multiple communication modes to various parties associated with the product. For example, the portal may contain phone numbers, text addresses, email addresses, instant messengers, other types of addresses, other types of communication modes, or combinations thereof. Thus, the user has options, if he or she desires, to communicate with at least one party associated with the product. Also, the mobile device may send an alert to at least one party, make a post visible to at least one party, or communicate in other ways to at least one party that the user has viewed the visual trigger. Thus, the party receiving the alert or other type of message may send a message to the mobile device, send an email associated with the user, send another type of message to the user other than by sending a message to the mobile device, or combinations thereof. The message from the party may include information about the product, surveys, contact information, introductions to people associated with the product, promotions, coupons, services, other types of information, or combinations thereof.

The library 700 may be changed from time to time. As such, the executable files may be updated or changed over time. Thus, the recognition of a visual trigger at a first time may result in the execution of a first executable file. However, the recognition of the same visual trigger at a later, second time may result in the execution of a second executable file. As an example, a mobile device may recognize a visual trigger which results in a first video being downloaded to the mobile device. The video may be viewable five times before the video becomes inaccessible from that mobile device. The user may cause the mobile device to recognize the same visual trigger with the same mobile device. This time, however, the mobile device is caused to download a different video. In the intervening time between when the mobile device recognized the visual triggers, the library was updated and the second video became associated with the visual trigger.

Figure 8:
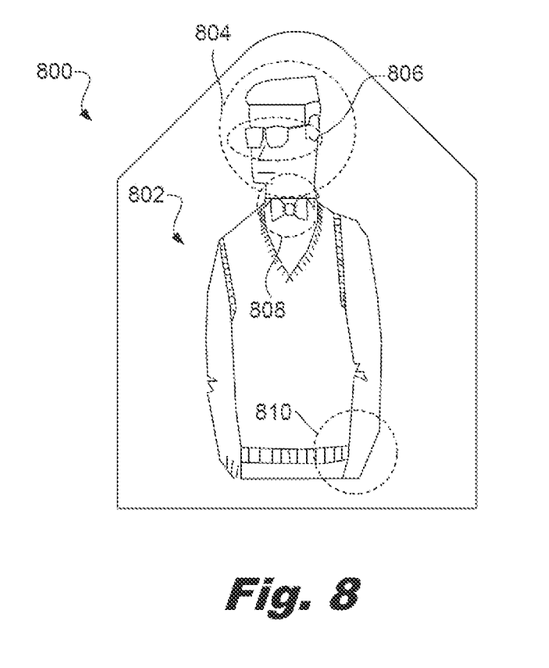
FIG. 8 illustrates a view of an example of visual triggers on packaging in accordance with the present disclosure.

FIG. 8 depicts an image 800 on a package of a contact lens. In this example, multiple visual triggers are included in the image 800. For example, the image 800 includes a portion of an person 802 wearing several articles of clothing. In some examples, the person's face 804 is a visual trigger. Image recognition programs may be used by the mobile device to recognize the person's face 804. Other visual triggers may include the person's glasses 806 or the person's bow tie 808. In examples of other images, other articles of clothing or other types of features in the image may be used as the visual triggers. For example, the user's mouth, hat, hair, earring, watch, embroidered symbol on clothing, or other features may be used as the visual triggers. In the illustrated example, the junction 810 of the person's arm and belt is used as the visual trigger. In some cases, the visual indicators in the image must be in the proper positions in the image to be recognized as part of a visual trigger.

In some examples, just a single visual trigger is used. In other examples, the combination of features is used to form the visual trigger. For example, the combination of the person's glasses 806 and bow tie 808 may collectively form the visual trigger. In other cases, multiple features of an image may be independent visual triggers that cause different responses. For example, a first visual trigger may cause a promotion to be downloaded to the mobile device, and a second visual trigger may cause the mobile device to establish a communication mode with a party.

Figure 9:
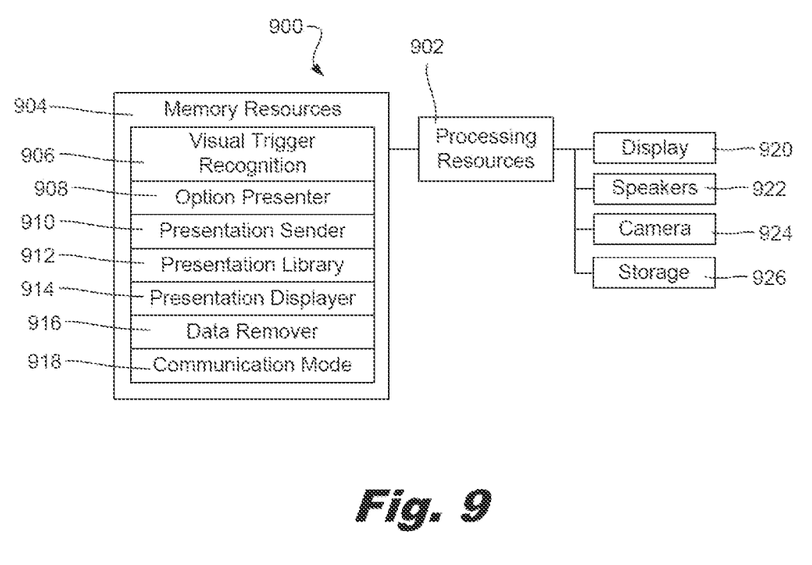
FIG. 9 illustrates a block diagram of an example of a trigger system in accordance with the present disclosure.

FIG. 9 illustrates a perspective view of an example of a trigger system 900 in accordance with the present disclosure. The trigger system 900 may include a combination of hardware and programmed instructions for executing the functions of the trigger system 900. In this example, the trigger system 900 includes processing resources 902 that are in communication with memory resources 904. Processing resources 902 include at least one processor and other resources used to process the programmed instructions. The memory resources 904 represent generally any memory capable of storing data such as programmed instructions or data structures used by the trigger system 900. The programmed instructions and data structures shown stored in the memory resources 904 include visual trigger recognition 906, an option presenter 908, a presentation sender 910, a presentation library 912, a presentation displayer 914, a data remover 916, and a communication mode 918.

The processing resources 902 may be in communication with a display 920, a speaker 922, a camera 924, and a local storage 926, or combinations thereof. In some examples, the processing resources 402 communicate with the external devices through a mobile device which relays communication between the processing resources 402 and the remote devices. The display 920, speaker 922, camera 924, and local storage 926 may be incorporated into a single mobile device. In some examples, the processing resources 902 is also incorporated into the mobile device. In yet other examples, at least some of the code in the memory resources is located in the mobile device.

In examples where at least some of the processing resources 902, memory resources 904, and components of the mobile device are not embodied in a single component, the processing resources 902, memory resources 904, and/or components of the mobile device may communicate over any appropriate network and/or protocol through the communications interface. In some examples, the communications interface includes a transceiver for wired and/or wireless communications. For example, these devices may be capable of communicating using the ZigBee protocol, Z-Wave protocol, BlueTooth protocol, Wi-Fi protocol, Global System for Mobile Communications (GSM) standard, another standard or combinations thereof. In other examples, the user can directly input some information into the trigger system 900 through a digital input/output mechanism, a mechanical input/output mechanism, another type of mechanism or combinations thereof.

The memory resources 904 include a computer readable storage medium that contains computer readable program code to cause tasks to be executed by the processing resources 402. The computer readable storage medium may be a tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory or combinations thereof.

The visual trigger recognition 906 represents programmed instructions that, when executed, cause the processing resources 902 to recognize a visual trigger. Such a visual trigger may be depicted on a package for a contact lens. In other examples, the visual trigger may be depicted on other packages or other objects. In some examples, the camera 924 of the mobile device recognizes the visual trigger when the visual trigger is in the camera's field of view. Based on just the information collected through the lens, the visual trigger recognition 906 may recognize the visual trigger. In other examples, the visual trigger is reconstructed in a display 920 of the mobile device, and based on the constructed image in the display 920, the visual trigger recognition 906 recognizes the visual trigger.

The option presenter 908 represents programmed instructions that, when executed, cause the processing resources 902 to present an option to the user in response to recognizing the visual trigger. Such an option may include downloading data, giving permission to access a remote location, presenting a promotion, playing a video, playing an audio recording, establishing a connection, receiving an information stream, another option, or combinations thereof.

The presentation sender 910 represents programmed instructions that, when executed, cause the processing resources 902 to send a presentation to the mobile device. In some examples, such a presentation may be sent to the mobile device from a presentation library 912 in response to the user selecting an option to receive the presentation. In other examples, the presentation may be sent to the mobile device in response to recognition of the visual trigger where no option is presented to the user. The presentation sender 910 may cause the presentation to be downloaded to the mobile device. In other examples, the presentation sender 910 may be caused to be streamed to the mobile device. In some examples, the presentation is currently downloaded into the mobile device, such as in examples where the application running on the mobile device already includes the full executable files.

The presentation displayer 914 represents programmed instructions that, when executed, cause the processing resources 902 to display the presentation through the mobile device. In some examples, the presentation displayer 914 may cause a video component of the presentation to be displayed in the display 920 of the mobile device. Further, the presentation displayer 914 may cause an audio component of the presentation to be presented through the speakers 922 of the mobile device. In some examples, the presentation includes just a video component, just an audio component, just another type of component, or combinations thereof.

The data remover 916 represents programmed instructions that, when executed, cause the processing resources 902 to remove data from the mobile device. In examples where the data is removed, the downloaded data may be removed from the mobile device in response to a predetermined condition. For example, the downloaded data may be removed after the presentation has been accessed a predetermined number of times. In another example, the downloaded data may be removed after a predetermined length of time since the data was downloaded or since the time that the visual trigger was recognized by the mobile device. While these examples have been described with reference to specific conditions that cause the data to be removed, any appropriate condition may be used to cause the data to be removed from the mobile device. Having a mechanism for causing the downloaded data to be removed may encourage the user to purchase more products that depict visual triggers or encourage users to return to the packaging with the visual trigger often enough to ensure that the user is getting updates to the downloadable data.

The communication mode 918 represents programmed instructions that, when executed, cause the processing resources 902 to establish a mechanism whereby the mobile device may communicate with a party associated with the product in the packaging. For example, in response to recognizing a visual trigger in a package, the mobile device may establish communication with the party through any appropriate communication mode, such as through text, email, postings, alerts, other types of communications, or combinations thereof.

Further, the memory resources 904 may be part of an installation package. In response to installing the installation package, the programmed instructions of the memory resources 904 may be downloaded from the installation package's source, such as a portable medium, a server, a remote network location, another location or combinations thereof. Portable memory media that are compatible with the principles described herein include DVDs, CDs, flash memory, portable disks, magnetic disks, optical disks, other forms of portable memory or combinations thereof. In other examples, the program instructions are already installed. Here, the memory resources 904 can include integrated memory such as a hard drive, a solid state hard drive or the like.

In some examples, the processing resources 902 and the memory resources 404 are located within a mobile device, an external device, networked device, a remote device, another type of device, or combinations thereof. The memory resources 904 may be part of any of these device's main memory, caches, registers, non-volatile memory, or elsewhere in their memory hierarchy. Alternatively, the memory resources 904 may be in communication with the processing resources 902 over a network. Further, data structures, such as libraries or databases containing user and/or workout information, may be accessed from a remote location over a network connection while the programmed instructions are located locally. Thus, the trigger system 900 may be implemented with the mobile device, an external device, a phone, an electronic tablet, a wearable computing device, a head mounted device, a server, a collection of servers, a networked device, a watch, or combinations thereof. Such an implementation may occur through input/ output mechanisms, such as push buttons, touch screen buttons, speech commands, dials, levers, other types of input/output mechanisms, or combinations thereof.

Figure 10:
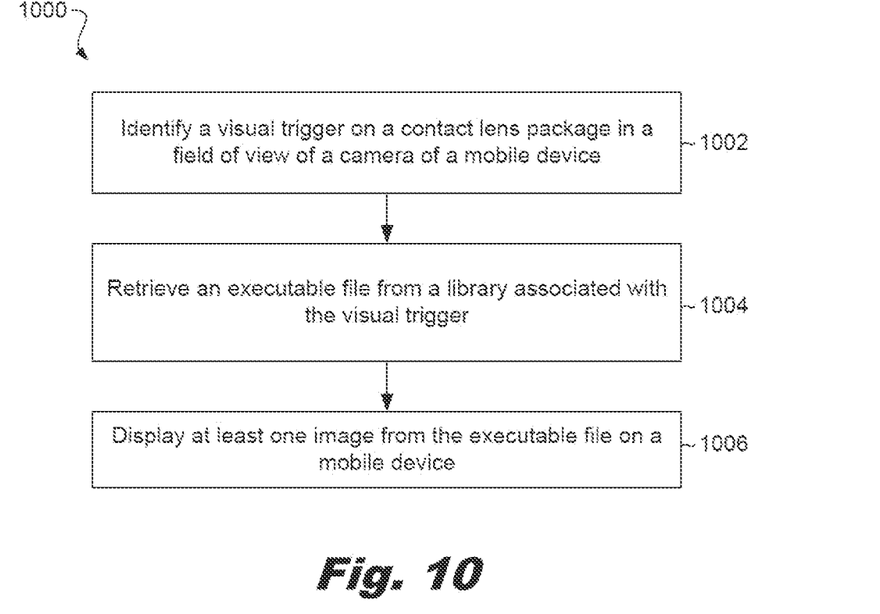
FIG. 10 illustrates a block diagram of an example of a method of retrieving an executable file in accordance with the present disclosure.

FIG. 10 illustrates a block diagram of an example of a method 1000 of retrieving an executable file in accordance with the present disclosure. In this example, the method 1000 includes identifying 1002 a visual trigger on a contact lens package in a field of view of a camera of a mobile device, retrieving 1004 an executable file from a library associated with the visual trigger, and displaying 1006 at least one image from the executable file on a mobile device.

At block 1002, the visual trigger is identified in the field of view of the mobile device's camera. In some examples, this includes depicting the contents within the camera's field of view in a digital display of the mobile device. In other examples, the mobile device does not have to present a digital image of the visual trigger or other contents within the camera's field of view to recognize the visual trigger.

At block 1004, an executable file from a library associated with the visual trigger is retrieved. The library may be a local library stored on the mobile device, or the library may be stored remotely. The executable file may include information that can be presented to the user through the display or speakers of the mobile device.

At block 1006, at least one image from the executable file may be displayed on the mobile device. Such an image may be a still image or a motion image, such as a video. In some examples, the image is part of an augmentation to the package presented in the display of the mobile device. For example, words that provide instructions on how to open the package may appear adjacent to features of the package. In other examples, a video that fills the entire screen of the display is presented to the user.

Figure 11:
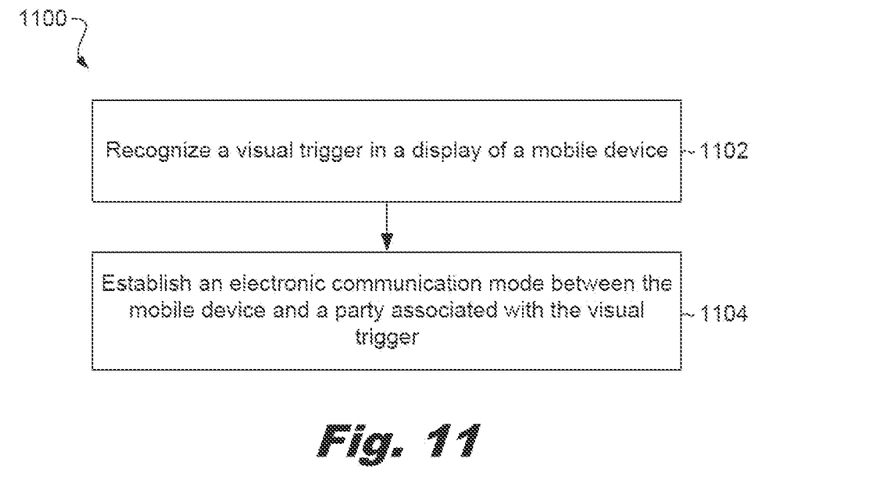
FIG. 11 illustrates block diagram of an example of a method of establishing a communication mode in accordance with the present disclosure.

FIG. 11 illustrates a block diagram of an example of a method 1100 of establishing a communication mode in accordance with the present disclosure. In this example, the method 1100 includes recognizing 1102 a visual trigger in a display of a mobile device and establishing 1104 an electronic communication mode between the mobile device and a party associated with the visual trigger.

At block 1104, the electronic communication mode may include text messages, email messages, instant chat messages, postings to websites, other types of electronic forms of communication, or combinations thereof. The electronic communication mode may also include receiving a message in any type of form from the party. The party may be any appropriate group that is associated with the contact lens. For example, the party may be a representative, a manufacturer, a distributor, a salesman, a health professional, another type of party, or combinations thereof.

Figure 12:
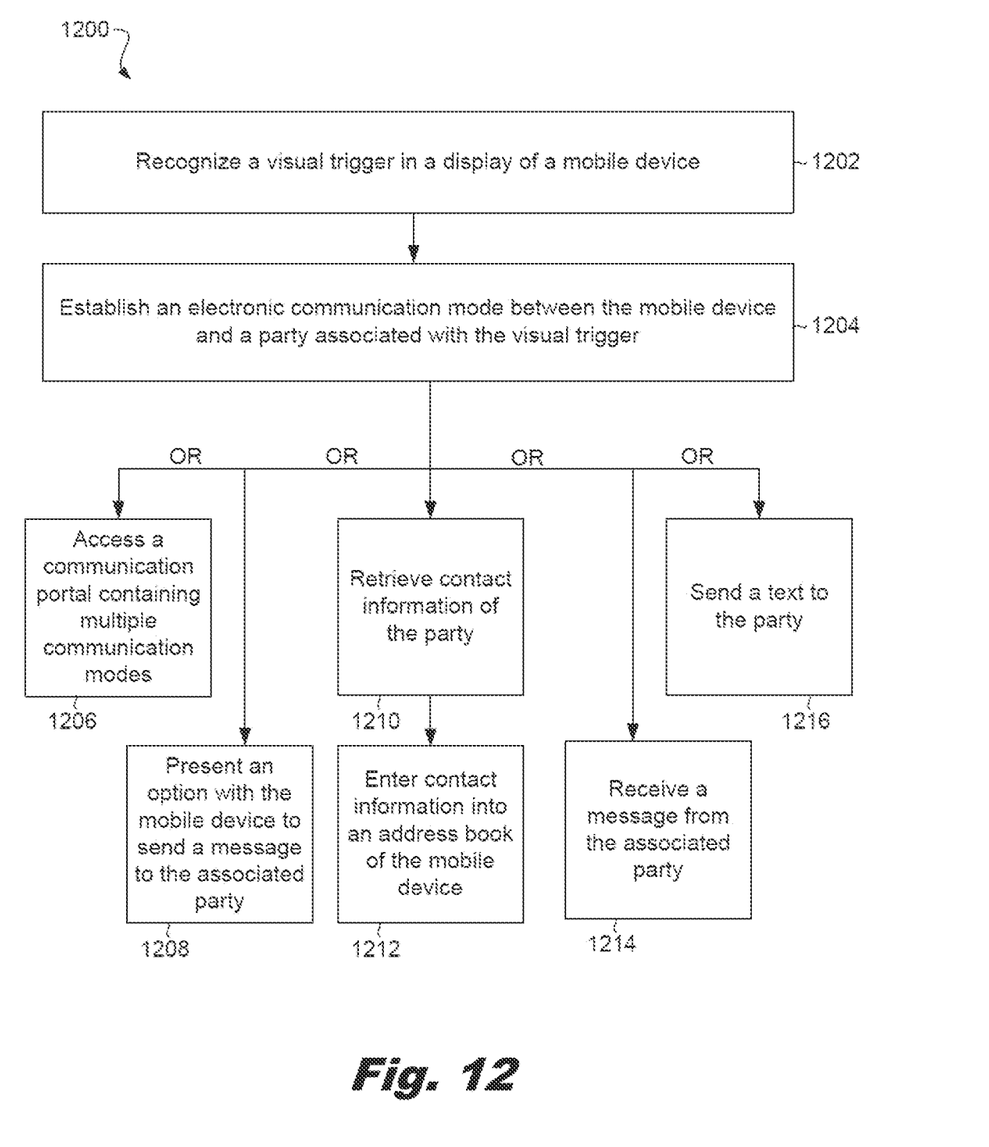
FIG. 12 illustrates a block diagram of an example of a method of establishing a communication mode in accordance with the present disclosure.

FIG. 12 illustrates a block diagram of an example of a method 1200 of establishing a communication mode in accordance with the present disclosure. In this example, the method 1200 includes recognizing 1202 a visual trigger in a display of a mobile device and establishing 1204 an electronic communication mode between the mobile device and a party associated with the visual trigger. The method includes multiple alternative mechanisms for establishing the electronic communication mode. The electronic communication mode is established by accessing 1206 a communication portal containing multiple communication modes, presenting 1208 an option with the mobile device to send a message to the associated party, retrieving 1210 contact information of the party and entering 1212 contact information into an address book of the mobile device, receiving 1214 a message from the associated party, or sending 1216 a text to the party.

At block 1206, the mobile device may be caused to direct the user to a communication portal where the user has multiple modes of establishing communication with a party. In some examples, the portal presents multiple parties with whom the user can communicate. For example, the user may be able to communicate with a manufacturer, a distributer, a doctor, a salesman, another type of party associated with the product in the packaging, or combinations thereof through the portal. In yet other examples, the communication portal may provide the user with a single party to contact. Also, the communication portal may provide one or more communication options for one or more of the parties listed in the portal. The different communication modes that may be available through the portal may include text messaging, instant messaging, emailing, activity feeds, posting questions, receiving incoming communications, phone numbers, downloading contact information, other types of communications modes, or combinations thereof.

At block 1208, an option is presented to the user to send a message to the associated party. Such a message may be a standard message. Such standard messages may indicate that the user has received the product, the date that the packaging is opened, the location of where the product was opened, a serial number of the product in the packaging, other types of information, or combinations thereof. In some examples, the message may presented to the user in an editable format so that the user can generate the content what to include in the message. In yet other cases, no predetermined message is presented to the user and the user can input the type of message that he or she desires to send.

In some examples, the option is presented to the user through an pop-up box that asks the user if he or she desires to send a message. In other examples, the option is presented to the user through an audio recording. In yet other examples, a link may appear in the display with a link to a mechanism for sending the message.

At block 1210, the contact information of the party is received by the mobile device. An initial message may be sent to the party or a third party indicating that the visual trigger has been detected. In response to receiving the message that the visual trigger has been detected, the receiving party may send contact information to the mobile device. Such contact information may be the contact information of the party receiving the message. But, in other examples, the contact information may belong to a different party that has authorized the third party to send the contact information.

At block 1212, the contact information received from the party may be entered into an address book in the mobile device. As an example, contact information for a doctor knowledgeable about the contact lens in the packaging may be entered into the mobile device's address book. Then, in circumstances where the user of the mobile device has a question for the doctor, the user can look up the doctor's contact information in his or her address book.

At block 1214, the mobile device receives a message from a party associated with the contact lens or other product in the packaging. In such an example, the party may send the user a newsletter about the product, storage information about the product, usage information about the product, warnings about the product, information unrelated to the product, other types of information, or combinations thereof.

At block 1216, a text message is sent to the party. In this alternative example, the mobile device may generate a text to send to at least one of the parties associated with the product. In one example, the text is automatically sent in response to generating the text. In other examples, the user may have to instruct the mobile device to send the text message that was automatically generated. In other examples, the mobile device may present an option through the mobile device requesting permission to send the text.

Figure 13:
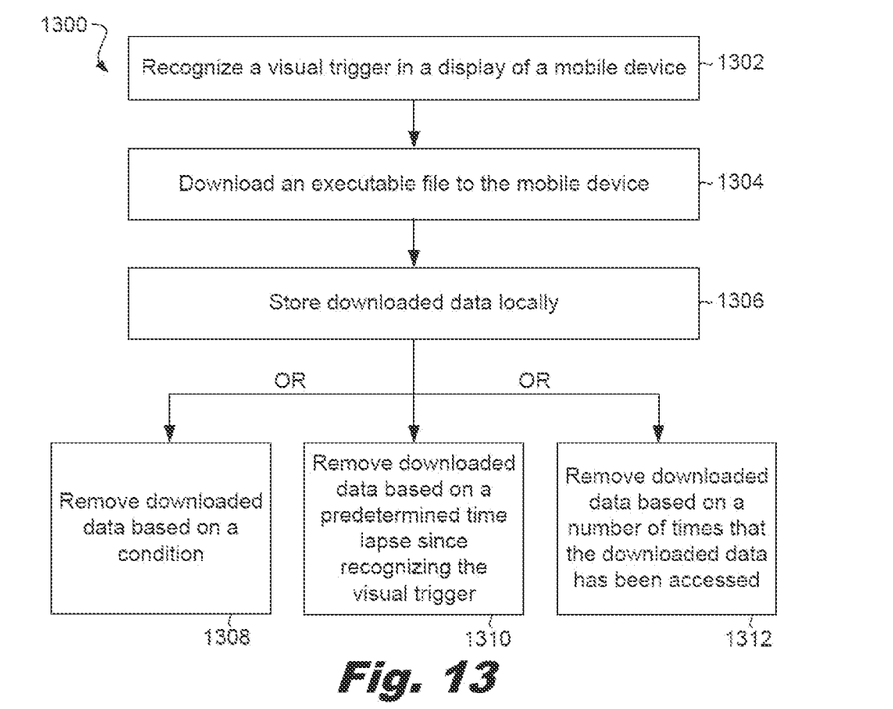
FIG. 13 illustrates a block diagram of an example of a method of storing data locally in accordance with the present disclosure.

FIG. 13 illustrates a block diagram of an example of a method 1300 of storing data locally in accordance with the present disclosure. In this example, the method 1300 includes recognizing 1302 a visual trigger in a display of a mobile device, downloading 1304 an executable file to the mobile device, and storing 1306 the downloaded data locally. The method may include multiple alternatives to removing the downloaded data. For example, the downloaded data may be removed by removing 1308 the downloaded data based on a condition, removing 1310 downloaded data based on a predetermined time lapse since recognizing the visual trigger, or removing 1312 the downloaded data based on a number of times that the downloaded data has been accessed.

At block 1306, the data is stored locally on the mobile device. The data may be stored in permanent memory, temporary memory, another type of memory, or combinations thereof. In some instances, the data may be stored locally, but protected with a password or accessible under just certain conditions.

At block 1308, the data is removed based on a condition. Such a condition may be a request from the user to remove the data. In other examples, the condition may be a message from a party responsible for updating the data. In yet other examples, the condition may be a condition that is based on user behavior, such as the number of times that the user accesses that data as described in block 1312. In some cases, the time lapse from when the visual trigger is identified or when the data was downloaded may be a condition that triggers the removal of the data as described in block 1310.

Figure 14:
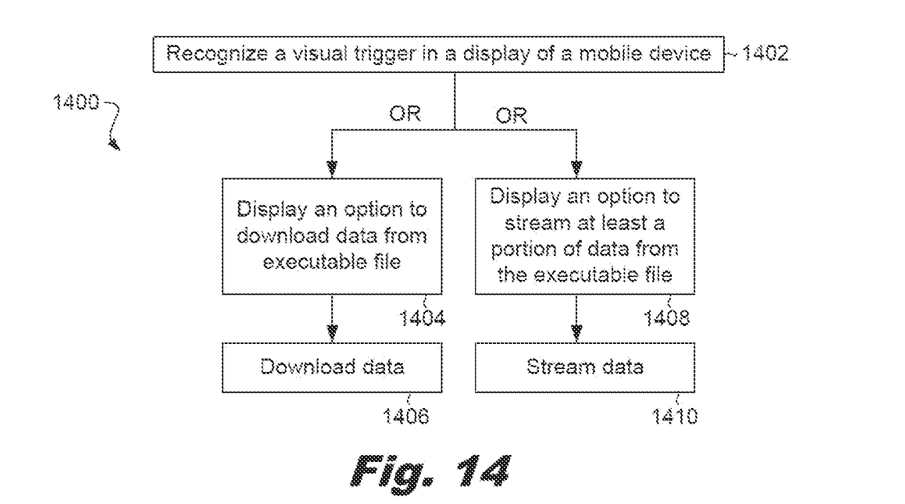
FIG. 14 illustrates a block diagram of an example of a method of displaying options in accordance with the present disclosure.

FIG. 14 illustrates a block diagram of an example of a method 1400 of displaying options in accordance with the present disclosure. In this example, the method 1400 includes recognizing 1402 a visual trigger in a display of a mobile device. The method may also include alternatives types of ways to display options. The options may include displaying 1404 an option to download data from an executable file and downloading 1406 the data or displaying 1408 an option to stream at least a portion of data from the executable file and streaming 1410 the data.

At block 1404, the mobile device may display an option to download data from the executable device in response to identifying the visual trigger with the mobile device. In such an example, the data may be downloaded based on user input. In response to recognizing the visual trigger, the mobile device may present an option to download the executable file. In response to the user selecting the option to download, at least a portion of the executable file's data may be downloaded as described in block 1406.

At block 1408, the display may present an option to the user through the mobile device to stream data to the mobile device. In some examples, the option to stream the data is presented to the user with the option to download the data. In other examples, the mobile device presents just one option for retrieving the data. In some cases, the option to stream the data to the mobile device may not explicitly state that the data is to be streamed but the option may generally indicate that the data may be retrieved in response to selecting the option. In response to instructions from the user, the mobile device may receive a stream of data. Such a stream may include presentations with video and/or audio components. In those circumstances, just the video and audio components of the executable file may be streamed to the mobile device.

Figure 15:
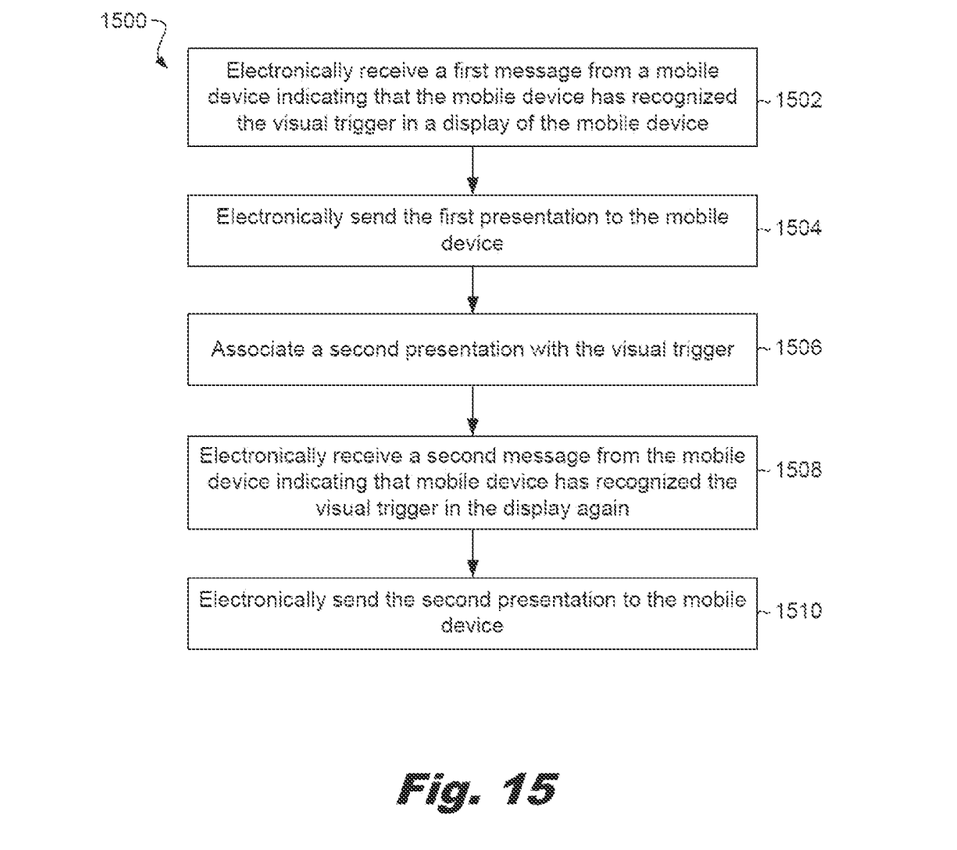
FIG. 15 illustrates a block diagram of an example of a method of sending presentations in accordance with the present disclosure.

FIG. 15 illustrates a block diagram of an example of a method 1500 of sending presentations in accordance with the present disclosure. In this example, the method 1500 includes electronically receiving 1502 a first message from a mobile device indicating that the mobile device has recognized the visual trigger in a display of the mobile device, electronically sending 1504 the first presentation to the mobile device, associating 1506 a second presentation with the visual trigger, electronically receiving 1508 a second message from the mobile device indicating that the mobile device has recognized the visual trigger in the display again, and electronically sending 1510 the second presentation to the mobile device.

At block 1502, the message from the mobile device indicates that the visual trigger has been recognized. In response, the mobile device or a remote device may consult with a library to determine which executable file is associated with the recognized visual trigger. In those cases, where the executable file contains a presentation, the presentation may be associated with the visual trigger.

At block 1504, a first presentation is sent to the mobile device. The presentation may be associated with the recognized visual trigger based on information contained in the library.

At block 1506, a second presentation is associated with the visual trigger. As a result, the first presentation may not be associated with the visual trigger any more. In other examples, the visual trigger is associated with both presentations. The second presentation may be associated with the visual trigger because of a promotion change, the presentation is updated, another factor, or combinations thereof.

At block 1508, a second message may be received from the mobile device indicating that the mobile device has recognized the visual trigger again. For example, in those circumstances where the first presentation has been removed from the mobile device or is otherwise inaccessible, the user may be motivated to use the mobile device to re-recognize the visual trigger. In response to recognizing the visual trigger again, the mobile device may consult the library. In some circumstances, the mobile device discovers that the visual trigger is associated with a second presentation unlike the original time that the mobile device consulted with the library.

At block 1510, the second presentation may be sent to the mobile device. The second presentation is sent to the mobile device because the second presentation is associated with the visual trigger in the library. In some cases, just the second presentation is sent to the mobile device. But, in those circumstances where multiple presentations are associated with the visual trigger in the library, multiple presentations may be sent to the mobile device.

What is claimed is:

1. A contact lens package, comprising: a first package layer;
  a second package layer joined to the first package layer at an edge of the first package layer, the first package layer and the second package layer collectively defining a cavity;
a contact lens disposed within the cavity; and
a visual trigger depicted on at least one of the first package layer and the second package layer;
wherein the visual trigger is identifiable by a mobile device to be associated with an executable file.

2. The contact lens package of claim 1, wherein the executable file comprises code to cause an image about the contact lens to be depicted by a display of the mobile device.

3. The contact lens package of claim 1, wherein the executable file comprises code to cause a video unrelated to the contact lens to be depicted by a display of the mobile device.

4. The contact lens package of claim 1, wherein the executable file comprises code to cause an instructional video to be depicted by a display of the mobile device.

5. The contact lens package of claim 1, wherein the executable file contains at least one still image.

6. The contact lens package of claim 1, wherein the executable file is specific to a feature of the contact lens.

7. The contact lens package of claim 1, wherein the executable file is specific to a feature of the contact lens package.

8. A contact lens package, comprising:
an outer layer; and
an image disposed on the outer layer, the image including:
an image portion capable of imparting information to a user without a mobile device; and
a visual trigger arranged with the image portion and associated with an executable file that is accessible by a mobile device;
wherein the visual trigger, when identified by the mobile device, causes the mobile device to retrieve and access the executable file.

9. The contact lens package of claim 8, wherein the visual trigger is capable of imparting information to the user without a mobile device.

10. The contact lens package of claim 9, wherein the visual trigger comprises an image, a symbol, or a combination thereof.

11. The contact lens package of claim 8, wherein the executable file comprises code to cause an image associated with the contact lens package to be depicted by a display of the mobile device.

12. The contact lens package of claim 11, wherein the image comprises a visual augmentation of the contact lens package.

13. The contact lens package of claim 8, wherein the visual trigger is identifiable by the mobile device to generate an augmentation of a real-world environment, the real-world environment captured by a camera of the mobile device.

14. The contact lens package of claim 8, wherein the image portion and the visual trigger are continuous portions of the image.

15. The contact lens package of claim 8, wherein the image portion and the visual trigger cooperate to define a boundary of the image.

16. The contact lens package of claim 8, wherein the contact lens package comprises:
a first package layer; and
a second package layer joined to the first package layer at an edge of the first package layer;
wherein the outer layer is an outer layer of one of the first package layer or the second package layer.

17. The contact lens package of claim 16, wherein the first package layer and the second package layer collectively define a cavity; and
further comprising a contact lens disposed within the cavity.

18. The contact lens package of claim 8, wherein the executable file comprises code, which when accessed by the mobile device, causes the mobile device to display a presentation about a contact lens of the contact lens package on a display of the mobile device.

19. The contact lens package of claim 8, wherein the visual trigger is identifiable by the mobile device and associateable with multiple executable files so that:
upon a first identification of the visual trigger by the mobile device, a first executable file is retrieved and accessed; and
upon a second, subsequent identification of the visual trigger, a second executable file is retrieved and accessed that is different from the first executable file.

20. A contact lens package, comprising:
a first package layer;
a second package layer joined to the first package layer at an edge of the first package layer, the first package layer and the second package layer collectively defining a cavity;
a contact lens disposed within the cavity; and
a visual trigger depicted on at least one of the first package layer and the second package layer;
wherein the visual trigger is identifiable by a mobile device to be associated with an executable file, the executable file, when accessed by the mobile device, causing the mobile device to display an image associated with the contact lens package.

* * * * *